(12) United States Patent
Makishima et al.

(10) Patent No.: US 8,220,877 B2
(45) Date of Patent: Jul. 17, 2012

(54) ELECTRIC PARKING BRAKE SYSTEM

(75) Inventors: Takaharu Makishima, Tokyo (JP); Yukiya Uchimura, Tokyo (JP); Katsufumi Ichikawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 774 days.

(21) Appl. No.: 11/499,779

(22) Filed: Aug. 7, 2006

(65) Prior Publication Data

US 2007/0029876 A1 Feb. 8, 2007

(30) Foreign Application Priority Data

Aug. 8, 2005 (JP) ................................. 2005-229692
Sep. 14, 2005 (JP) ................................. 2005-266612

(51) Int. Cl.
*B60T 7/12* (2006.01)

(52) U.S. Cl. ............ 303/16; 303/191; 303/154; 303/89; 188/158

(58) Field of Classification Search .................... 303/16, 303/3, 20, 89, 125, 154, 155, 191, 199; 188/156, 188/158, 159; 180/283
See application file for complete search history.

(56) References Cited

U.S. PATENT DOCUMENTS

| 6,530,450 | B2 * | 3/2003 | DeLuca et al. ................. 180/275 |
| 6,802,574 | B2 * | 10/2004 | Ehrmaier et al. ................ 303/16 |
| 2002/0108816 | A1 | 8/2002 | Taniguchi |
| 2004/0226768 | A1 | 11/2004 | Deluca |
| 2006/0261764 | A1 | 11/2006 | Erben et al. |
| 2009/0305848 | A1 * | 12/2009 | Straub et al. ................. 477/184 |

FOREIGN PATENT DOCUMENTS

| DE | 39 09 907 A1 | 9/1990 |
| JP | 10-24816 | 1/1998 |
| JP | 2002-242968 | 8/2002 |
| JP | 2004-051039 | 2/2004 |
| JP | 2004-142517 | 5/2004 |
| JP | 2004142517 | 5/2004 |
| JP | 2005-081963 | 3/2005 |
| WO | WO 02/12036 A2 | 2/2002 |
| WO | WO 02/46007 A1 | 6/2002 |
| WO | WO 2005/063535 A1 | 7/2005 |

OTHER PUBLICATIONS

Extended European Search Report corresponding to EP 06 01 6574 dated Dec. 19, 2006.

* cited by examiner

*Primary Examiner* — Xuan Lan Nguyen
(74) *Attorney, Agent, or Firm* — Smith, Gambrell & Russell, LLP (57) ABSTRACT

An electric parking brake system is equipped with a parking brake driven by an electric actuator for braking wheels of a vehicle, a vehicle condition sensing section for detecting vehicle conditions, a target braking force setting section for setting a target braking force on the basis of vehicle condition detected, compared and weighted by the vehicle condition sensing section so as to overcome a trouble of a part of sensing section, a parking condition detecting section for sensing a change of the vehicle condition from a stopping condition to a parking condition, and a control section for increasing a braking force according to the change in the vehicle condition so as to avoid a creep movement of the vehicle. Thereby, the electric parking brake system with a highly improved reliability can be provided.

22 Claims, 10 Drawing Sheets

ELECTRIC PARKING BRAKE SYSTEM

BACKGROUND OF THE INVENTION

1. Field of the Invention

The present invention relates to an electric parking brake system provided on such a vehicle as an automotive vehicle.

The present application claims priority from Japanese Patent Application Nos. 2005-229692 and 2005-266612, the disclosures of which are incorporated herein by reference.

2. Description of the Related Art

The electric parking brake system is usually actuated by such an electric actuator as an electric motor for applying a braking force to a wheel of a vehicle while the vehicle is parking or stopping (see, for example, Japanese patent application laid-open No. 2004-51039).

As the electric parking brake is easily operational through an electrical changeover switch operated by a driver, such troublesome works as operations by a manual lever or foot stepping down operations of a brake pedal can be reduced. And, unintentional vehicle creeps due to a creeping phenomenon in an automatic transmission (hereinafter referred to as "AT creep") or an inclination of roads etc. can be also prevented by automatic actuation thereof in accordance with vehicle conditions. Accordingly, a safety improvement is also effectively attained.

Formerly, it is well known from, for example, Japanese patent application laid-open No. 2002-242968 that the electric parking brake is provided with an inclination sensor for detecting the inclination of the vehicle and a master cylinder pressure sensor for detecting a brake fluid pressure in a main brake, and that it is judged whether a brake actuation is required in dependency on output values therefrom.

Further, it is also known from prior arts that the electric parking brake may set a braking force in dependency on the output value from the inclination sensor so as to avoid the creeping of the vehicle when the vehicle is parking on an inclined road (see, for example, Japanese patent application laid-open No. 10-24816 and Japanese patent application laid-open No. 2004-142517).

However, there may occur a malfunction of inclination sensor in such a case. Therefore, it is requested to set an adequate braking force with a plurality of sensors in order to effectively eliminate creep of a vehicle on an inclined road even if the malfunction of inclination sensor occurs.

On the other hand, it is also well known from Japanese patent application laid-open No. 2004-51039 that the electric parking brake may be provided with a changeable braking force. For example, it is known therefrom that the electric parking brake may be provided to generate a larger braking force by a switch operation than that of ordinary braking operations of a manual parking brake by a driver.

In addition, a required braking force of the electric parking brake could be changeable even if a road inclination is constant. For example, in the case of deciding the braking force in accordance with an AT creep force, an idling speed is increased (idle up) for warming up the engine in order to re-start at an engine warm-up condition just immediately after the vehicle runs, and so the required braking force becomes large due to an increase of the AT creep force.

In such a case, it is well known from, for example, Japanese patent application laid-open No. 2005-81963 that the braking force may be increased in accordance with the increase of an engine r. p. m. by detecting the idle up of the vehicle.

In other words, the electric parking brake system requires cooperation with an engine control system for controlling the engine r. p. m. etc., but for doing so, a structure of the parking brake system becomes complicated.

Furthermore, as the electric parking brake has, for example, the defect that a friction coefficient between a brake drum and a brake shoe or between a brake disc and a pad etc. changes in dependency on a temperature decrease of such brake friction materials as written above after the vehicle runs, there may occur a situation where an actual braking force becomes lower than that set beforehand.

SUMMARY OF THE INVENTION

Accordingly, a purpose of the present invention is to provide an electric parking brake system to prevent a creep movement of a vehicle through increasing a brake force of the electric parking brake with a simple structure thereof when the vehicle is under a parking condition.

Another purpose of the invention is to provide an improved reliability for an electric parking brake system through using a plurality of vehicle condition detectors and additionally through using a general idea of weighting among them so as to overcome a malfunction of a part of sensors for detecting a vehicle condition.

In order to attain the first purpose of the present invention, according to the first aspect of the present invention, there is provided an electric parking brake system comprising a parking brake for changing a braking force of a vehicle by an electric actuator. The electric parking brake system comprises a parking condition detecting section for detecting a change in condition of the vehicle from a stopping condition to a parking condition, and a control section for increasing the braking force of the parking brake in accordance with the change in condition of the vehicle from the stopping condition to the parking condition when the parking brake is being in a braking condition.

According to the second aspect of the present invention, the parking condition detecting section includes a stopping operation detecting section for detecting a stopping operation of a driving power source of the vehicle, and the control section increases the braking force of the parking brake when the parking brake is being in the braking condition and the stopping operation is being detected.

Further, according to the third aspect of the present invention, the parking condition detecting section includes a locking sensor for detecting a locking state of a door lock apparatus of the vehicle, and the control section increases the braking force of the parking brake when the parking brake is being in the braking condition and also both the stopping operation and the locking state of the door lock apparatus of the vehicle are being detected.

The present inventions as mentioned above have the following effect for attaining the first purpose. That is, according to the first to third aspects of the present invention, since the braking force of the parking brake under the parking condition is increased than that of the parking brake under the stopping condition, it is possible to more sufficiently prevent the creep movement of the vehicle caused by an inclination of road or the like even if the friction coefficient of the braking members is lowered due to lowered temperature or thermal shrinkage while parking. Additionally, the AT creep with idle-up at a re-starting stage can also be avoided.

On the other hand, the frequency of automatically increasing of the parking braking force can be decreased to reduce a mechanical burden thereof through considering the locking condition of the door lock apparatus also in addition to the OFF-operation of the ignition switch.

In order to attain the second purpose of the present invention, according to the fourth aspect of the present invention, the electric parking brake system further comprises a plurality of vehicle condition detecting sections for detecting conditions of the vehicle and for outputting respective output values of the detected vehicle conditions, in which the output values is used for setting a target braking force. The electric parking brake system is further provided with a target braking force setting section for applying a larger weighting to one output value which makes the target braking force larger than the other output values after comparing the output values from the vehicle condition detecting sections, and for setting the target braking force based on the weighted output value.

According to the fifth aspect of the present invention, the vehicle condition detecting sections include a plurality of inclination sensors for detecting an inclination of the vehicle, and the target braking force setting section sets the target braking force on the basis of a larger output value of one inclination sensor than the output values of the other inclination sensors.

Lastly, according to the sixth aspect of the present invention, the vehicle condition detecting sections include an inclination sensor for detecting an inclination of the vehicle and a main brake sensor for detecting a parameter with interrelation to a braking force of a main brake of the vehicle, and the target braking force setting section compares the first braking force derived from the output value of the inclination sensor and the second braking force derived from the output of the main brake sensor, and sets the target braking force on the basis of the output value of the sensor which requires a larger braking force in both the sensors.

The present inventions as mentioned above have the following effect for attaining the second purpose. That is, according to the fourth to sixth aspects of the present invention, even if one of vehicle condition detecting sensors such as inclination sensors provided in the electric parking brake system is in trouble to present a lower target braking force than an actual one, the detected value of the other sensor having a tendency of presenting a higher target braking force is weighted and utilized for setting the target braking force. Thereby, the reliability of the electric parking brake system can be improved.

BRIEF DESCRIPTION OF THE DRAWINGS

These and other objects and advantages of the present invention will become understood from the following description with reference to accompanying drawings, wherein.

DETAILED DESCRIPTION OF THE PREFERRED EMBODIMENTS

First Embodiment

An electric parking brake system as a first embodiment of the present invention will be hereinafter explained with FIGS. 1-3.

Figure 1:
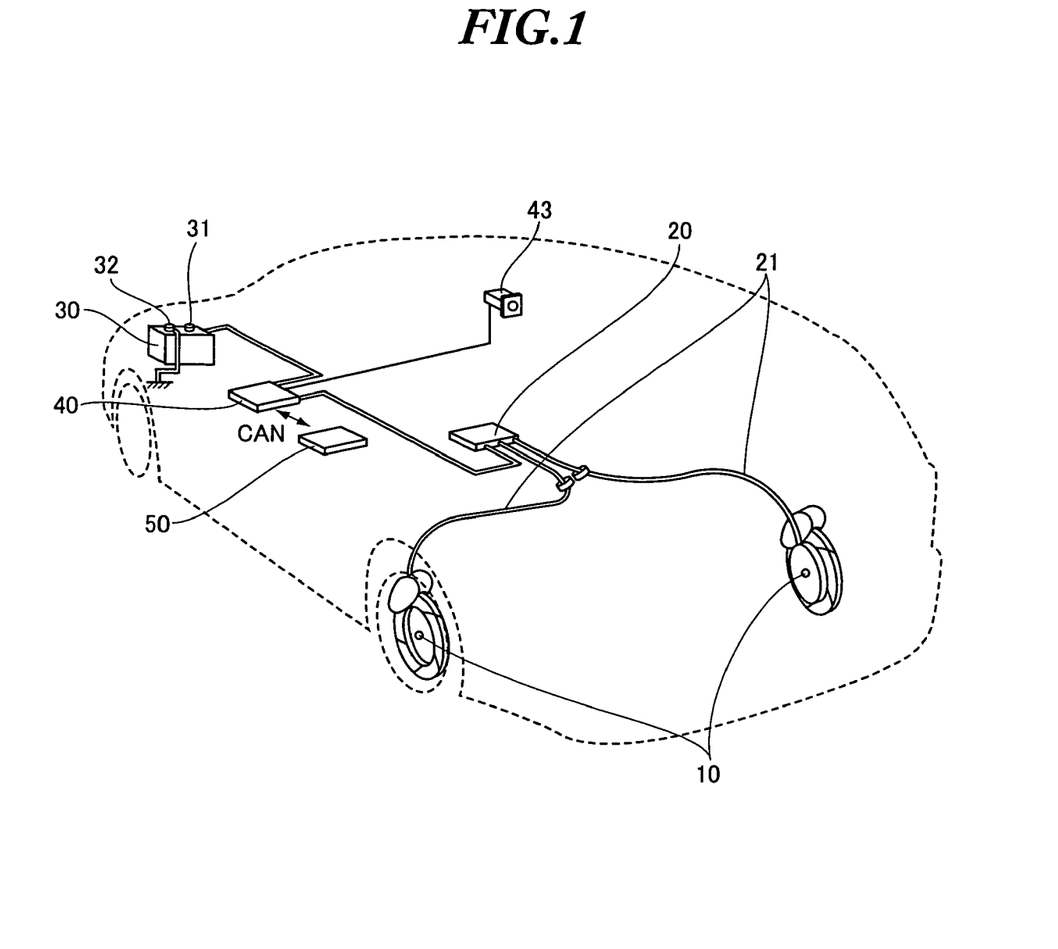
FIG. 1 is a schematic view for illustrating a structure of an electric parking brake system for a vehicle as a first embodiment of the present invention.
Figure 2:
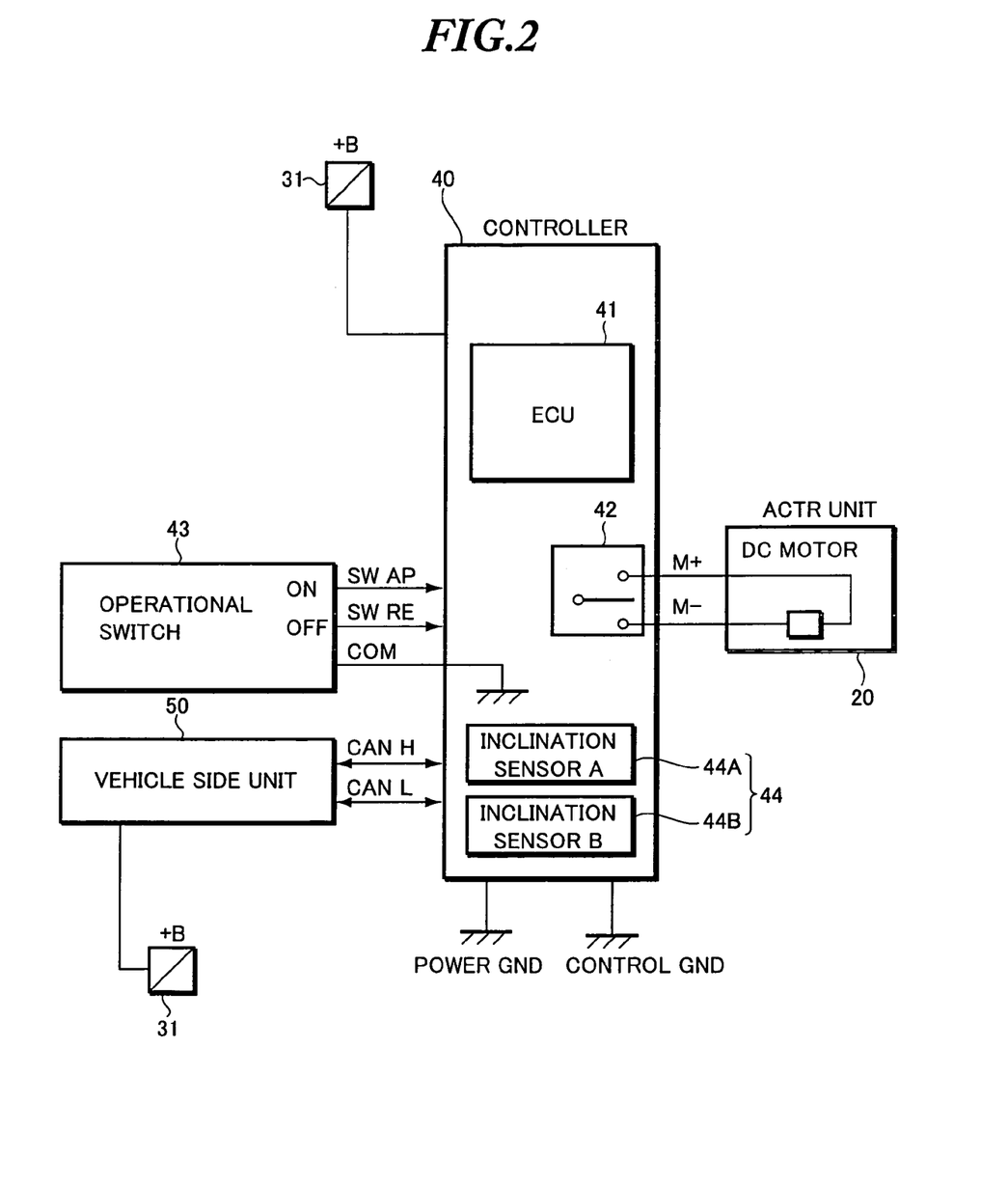
FIG. 2 is a block diagram for showing a circuit structure of the electric parking brake system of FIG. 1.

As shown in FIG. 1, an electric parking brake system comprises a parking brake 10, an actuator unit 20, a battery 30, a controller 40 and a vehicle side unit 50.

The parking brake 10 is a brake apparatus for preventing a movement of a vehicle while stopping or parking through braking vehicle wheels, and provided at respective wheel hub portions of rear left and right wheels. The parking brake 10 comprises a brake drum (not shown) provided at an inner diameter side of a rotor of a disc brake and a brake shoe (not shown) contacting with the inner diameter side of the brake drum by a pressure while applying a braking force.

The actuator unit 20 actuates the brake shoe of the parking brake 10 to make the changeover between a braking condition where the braking force is applied and a brake released condition where the braking force is not substantially generated. The actuator unit 20 is provided with a parking brake cable 21 and fixed to, for example, a floor panel of the vehicle.

The actuator unit 20 rotates, for example, a lead screw after reducing a rotational speed of a direct current motor by a speed reduction gear train, and pull or release the parking brake cable 21 by an equalizer threaded to the lead screw.

The parking brake cable 21 is separately provided, corresponding to the respective left and right parking brakes 10, and has a flexibility to be easily deformed in accordance with a stroke of a rear suspension (not shown). The parking brake cable 21 keeps the parking brake 10 in a braking condition by being pulled and in a released condition by being released.

Here, the actuator unit 20 is provided with a function of controlling the braking force of the parking brake 10, which is performed by an adjustment of a tensional force against the parking brake cable 21, while keeping a braking condition. This alignment of the tensional force is controlled by changing the stroke of pulling the parking brake cable 21, and accordingly, the actuator unit 20 has a stroke sensor (not shown) for detecting the stroke.

The battery 30 is a secondary battery used for a main electric power source of an electrical equipment of the vehicle, and for example, is used for generating a terminal voltage of 12 volt direct electrical current. The battery 30 is provided with a plus terminal 31 and a minus terminal 32.

The plus terminal 31 is connected to the controller 40 and the vehicle side unit 50 via a harness.

And, the minus terminal 32 is grounded to a vehicle body.

The controller 40 is provided with an electrical control unit (ECU) 41, a relay 42, a manual operational switch 43 and an inclination sensor 44.

The ECU 41 is also provided with a central processing unit (CPU) which is used for not only judging whether or not an actuation of the parking brake 10 is required in response to an input signal from the manual switch 43 and the vehicle side unit 50 but also setting a target braking force as explained later.

The relay 42 is provided for supplying the driving electric power to the actuator unit 20 in accordance with the control signal outputted from the ECU 41. And, the relay 42 keeps a neutral condition by disconnecting with the actuator unit 20 except when driving the actuator unit 20, and has the function of reversing a polarity of the driving electric power in order to change a braking condition from a braking condition to a released condition or vise versa of the parking brake 10.

The manual operational switch 43 is used for manually selecting an operational method of the braking or released conditions, and for example, a push button (not shown) is provided on an instrument panel on the vehicle. The manual operational switch 43 transmits the input signal to the ECU 41, and then, the ECU 41 controls the relay 42 in accordance with the input signal to supply the driving electric power to the actuator unit 20 for driving the parking brake 10.

The inclination sensor 44 works as the vehicle condition detecting section for deciding the braking force of the parking brake 10 while stopping the vehicle by detecting the inclination of the vehicle due to mainly the road surface inclination, and for example, two lines of inclination sensors are independently provided. The explanation of each inclination sensor affixed with 44A, 44B will be given later.

The vehicle side unit 50 is provided with, for example, an engine control unit for controlling the engine of the vehicle, a transmission control unit for controlling the transmission of vehicle, a VDC control unit for performing a VDC control including an ABS control unit and an integrated vehicle control unit for integrally controlling the other electrical equipments of the vehicle. And all of the above mentioned control units are communicated with the controller 40 via a CAN communication system which is one kind of LAN systems mounted on the vehicle.

The vehicle side unit 50 supplies the information about, for example, an engine r. p. m., an opening degree of an accelerator pedal, a shift position of the transmission, an operational condition of the foot brake pedal and a rotational speed of wheels, to the ECU 41 in the controller 40 one by one. The ECU 41 provides the driving electric power to the actuator unit 20 after controlling the relay 42 through judging that the parking brake is required to be actuated in case of that the vehicle condition is changed from the running condition to the parking condition on the basis of the input signals. On the other hand, the ECU 41 changes the parking brake 10 from the braking condition to the released condition in the case of that the vehicle condition is changed from the stopping condition to the running condition.

Next, a setting operation of the target braking force in the electric parking brake according to the first embodiment will be explained.

Figure 3:
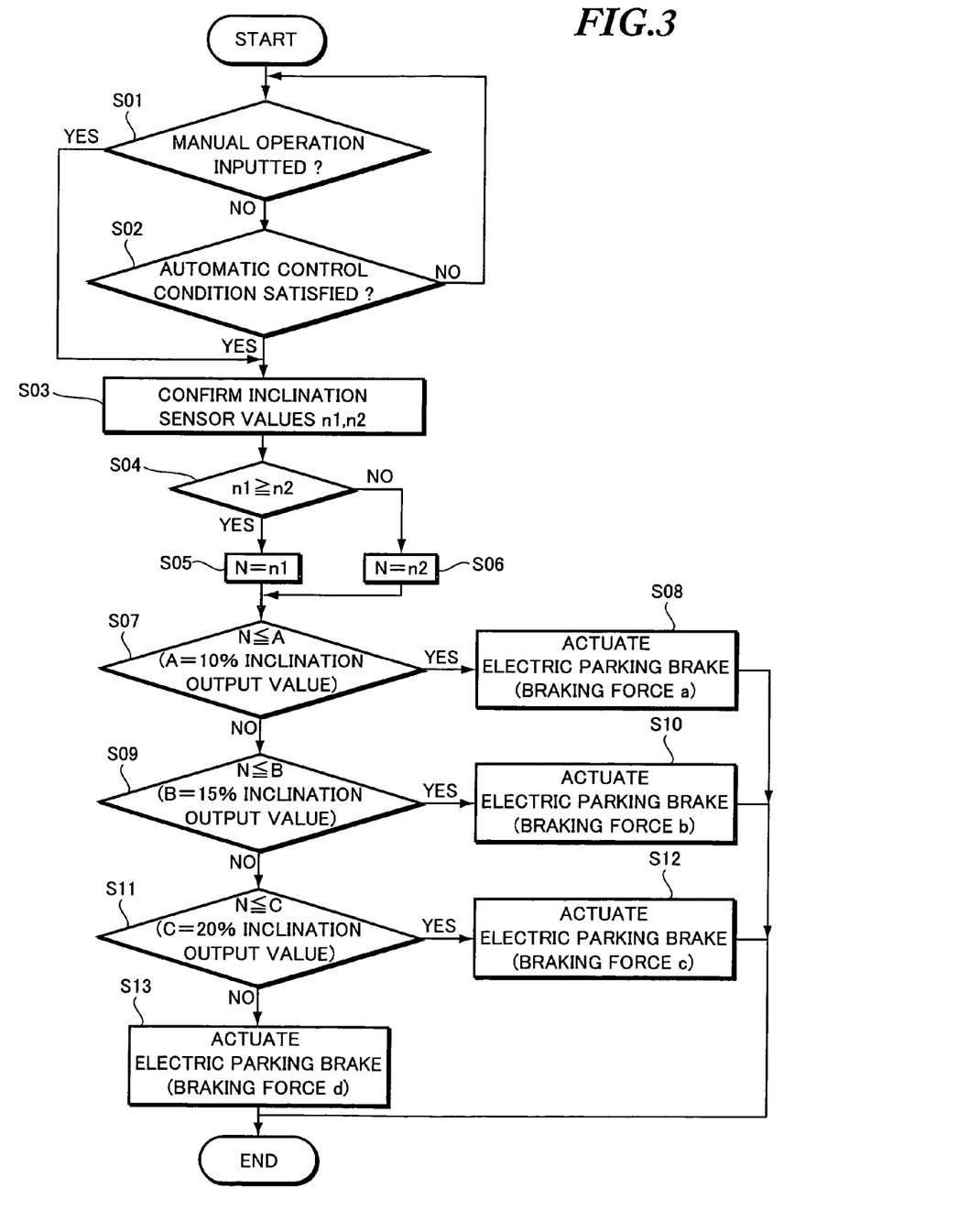
FIG. 3 is a flowchart illustrating a control of the electric parking brake system, as shown in FIG. 1, for setting a braking force thereof.

FIG. 3 is a flowchart for explaining the operation in setting of the target braking force. The process will be explained by following steps one by one.

First, at STEP S01, the ECU 41 detects whether the manual operation for changing over the operation of the parking brake 10 from the released condition to the braking condition is inputted or not. And then, it goes to STEP S03 if there is the inputted manual operation, and it goes to STEP S02 if there is no such an operation.

At STEP S02, the ECU 41 judges whether the automatic control conditions such as mentioned below are satisfied for automatically changing over the operation of the parking brake 10 from the released condition to the braking condition.

(a) vehicle wheel speed=0
(b) ON signal of a brake lamp switch interlocked with the brake pedal
(c) Both the conditions (a) and (b) continue for more than a predetermined time.

And, it goes to the STEP S03 if the above mentioned automatic control conditions are satisfied. If not so, it returns to the STEP S01 and repeats the above mentioned detection and judgment.

Next, at STEP S03, the ECU 41 acquires and confirms the inclination sensor values n1 and n2 outputted from the inclination sensors 44A and 44B which detect the vehicle inclination, in which the inclination sensor values n1 and n2 have a positive interrelation against an angle of the vehicle inclination.

At STEP S04, the ECU 41 compares the inclination sensor values n1 and n2, in which it goes to the STEP S05 if n1≧n2, alternatively it goes to the STEP S06 if n1<n2.

At STEP S05, the ECU 41 adopts the inclination sensor values n1, which is larger than n2, outputted from the inclination sensor 44A as the standard inclination sensor value N. And then it goes to the STEP S07.

On the other hand, at STEP S06, the ECU 41 adopts the inclination sensor value n2, which is larger than n1, as the standard inclination sensor value N, and it goes to the STEP S07.

Furthermore, at STEP S07, the ECU 41 compares the standard inclination sensor value N with a predetermined 10% inclination output value A. This 10% inclination output value A is an estimated value of the output from the inclination sensor in the case where the vehicle is stopped on an inclined road having the 10% inclination. Moreover, 15% inclination output value B and 20% inclination output value C, which will be explained hereinafter, have the same meaning as mentioned above.

And, it goes to STEP S08 in the case of "standard inclination sensor value N≦the predetermined 10% inclination output value A", and also to STEP S09 in the case of "standard inclination sensor value N>predetermined 10% inclination output value A".

At STEP S08, the ECU 41 drives the actuator unit 20 at the predetermined braking force a as the target braking force by controlling the relay 42, and changes the parking brake 10 from the released condition to the braking condition. And then, it proceeds to end the process.

This braking force a is set by multiplying a safety ratio as a predetermined coefficient by a desired braking force (vehicle weight (MAX)×inclination conversion value) required in the case where the vehicle is stopped on an inclined road having the 10% inclination. Moreover, respective braking forces b and c corresponding to 15% and 20% inclinations, which will be described hereinafter, are calculated in the same way as the braking force a.

An adjustment of the braking force by the actuator unit 20 can be performed, for example, by changing a torque of a DC motor or a traction stroke of the actuator cable 21.

At STEP S09, the ECU 41 compares the standard inclination sensor value N with a predetermined 15% inclination output value B. After comparing, it goes to STEP S10 in the case of "standard inclination sensor value N≦predetermined 15% inclination output value B", and alternatively to STEP S11 in the case of "standard inclination sensor value N>predetermined 15% inclination output value B".

At STEP S10, the ECU 41 drives the actuator unit 20 at the predetermined braking force b as the target braking force by controlling the relay 42, and changes the parking brake 10 from the released condition to the braking condition. And then, it proceeds to end the process.

At STEP S11, the ECU 41 compares the standard inclination sensor value N with a predetermined 20% inclination output value C. After comparing, it goes to STEP S12 in the case of "standard inclination sensor value N≦predetermined 20% inclination output value C", and alternatively to STEP S13 in the case of "standard inclination sensor value N>predetermined 20% inclination output value C".

At STEP S12, the ECU 41 drives the actuator unit 20 at the predetermined braking force c as the target braking force by controlling the relay 42, and changes the parking brake 10 from the released condition to the braking condition. And then, it proceeds to end the process.

At STEP S13, the ECU 41 drives the actuator unit 20 at a maximum predetermined braking force d as the target braking force by controlling the relay 42, and changes the parking brake 10 from the released condition to the braking condition. And then, it proceeds to end the process.

The maximum predetermined braking force d is set in consideration of, for example, a mechanical strength of the parking brake 10 and the actuator unit 20.

As explained above, according to the first embodiment of the present invention, the target braking force is set based on the output having a higher inclination value of values detected by the two inclination sensors 44A, 44B. Thereby, even if the inclination is detected as rather lower than an actual inclination value due to defects such as abnormal gain setting or malfunctions in either inclination sensor, it is possible to prevent the target braking force from being set at the value lower than the actual inclination. Therefore, the reliability of the electric parking brake system can be improved.

Further, since only the output value of one inclination sensor is used for setting the target braking force through just selecting the higher value, any complicated calculation is not necessary in the present invention.

Furthermore, since the target braking force can be selected from the plurality of the predetermined values (a, b, c and d) preset in accordance with the standard inclination sensor value N, the adjustments of the braking force through driving the actuator unit 20 can be performed simply without any complicated calculation.

Second Embodiment

Next, a second embodiment of the present invention will be explained with reference to FIGS. 4-6. The explanation about the same parts as those of the first embodiment is omitted, and the explanation about different points therefrom is mainly given.

Figure 4:
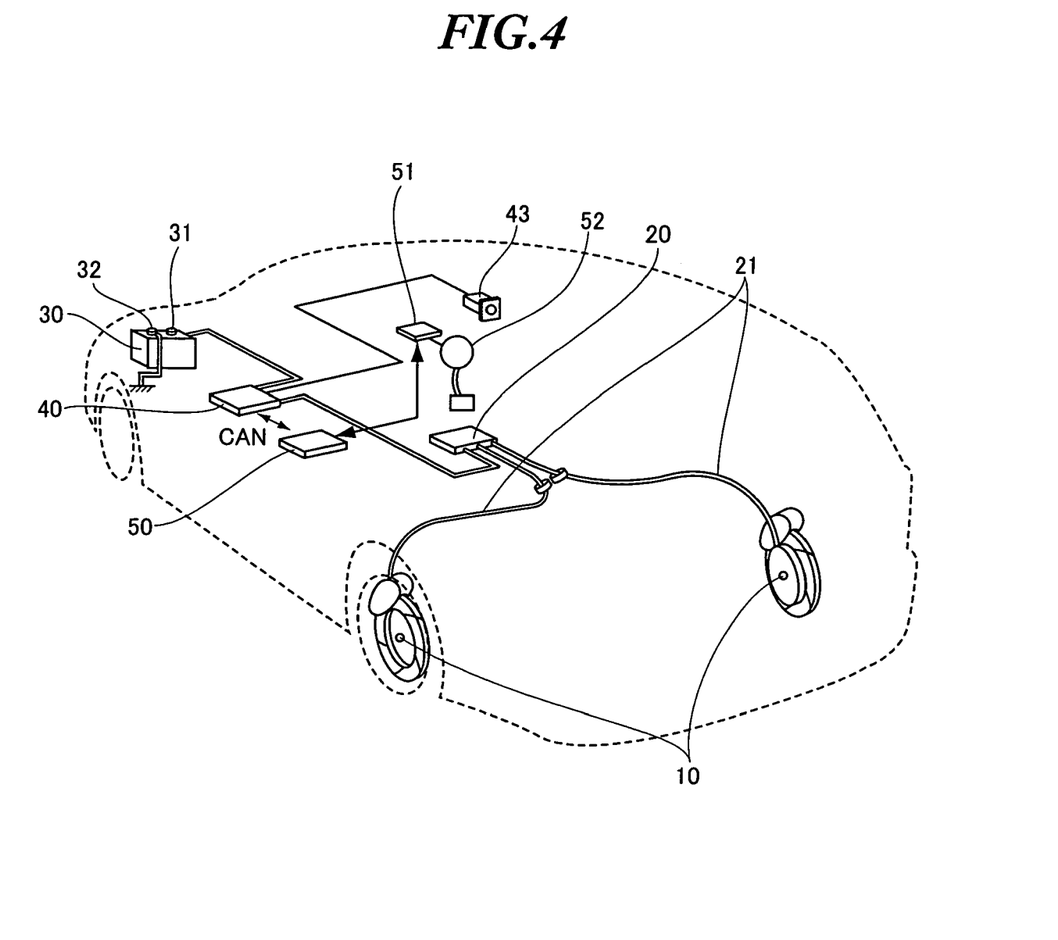
FIG. 4 is a schematic view for illustrating a structure of an electric parking brake system as a second embodiment of the present invention as a second embodiment of the present invention.
Figure 5:
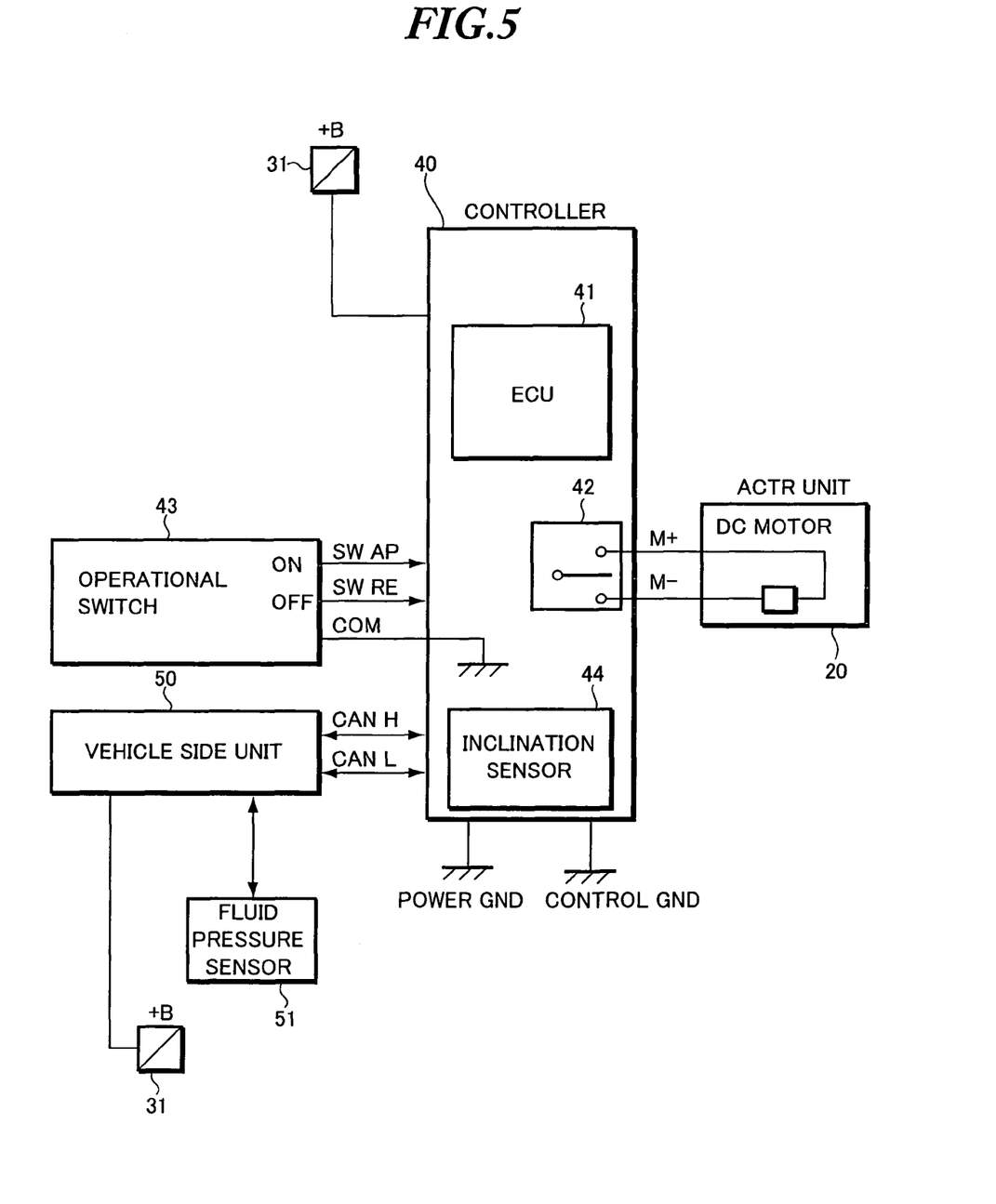
FIG. 5 is a block diagram for showing a circuit structure of the electric parking brake system of FIG. 4.

FIG. 4 is the schematic view of the electric parking brake system as the second embodiment, and FIG. 5 is the block diagram showing a circuit structure of the electric parking brake system.

The circuit structure of the electric parking brake system of the second embodiment is different from that of the first embodiment about the following two points. One is that a single inclination sensor 44 is provided in the controller 40, and another is that the output of a fluid pressure sensor 51 connected to a VDC control unit of the vehicle side unit 50 is transmitted to the ECU 41 of the controller 40.

The fluid pressure sensor 51 works as vehicle condition detecting means, and detects a brake fluid pressure to actuate the main brake as used for a running vehicle which is used as a parameter in relation with the braking force of the main brake on the vehicle. The fluid pressure sensor 51 is provided at a part of brake fluid lines connected to a master cylinder 52 with a booster for amplifying the fluid pressure generated by a pedaling operation of a driver foot by making use of a negative pressure in an intake pipe (not shown) of the engine. The fluid pressure sensor 51 is provided in, for example, a fluid pressure control unit for adjusting the brake fluid pressure provided to a piston portion of the main brake of each wheel for VDC and ABS controls.

Figure 6:
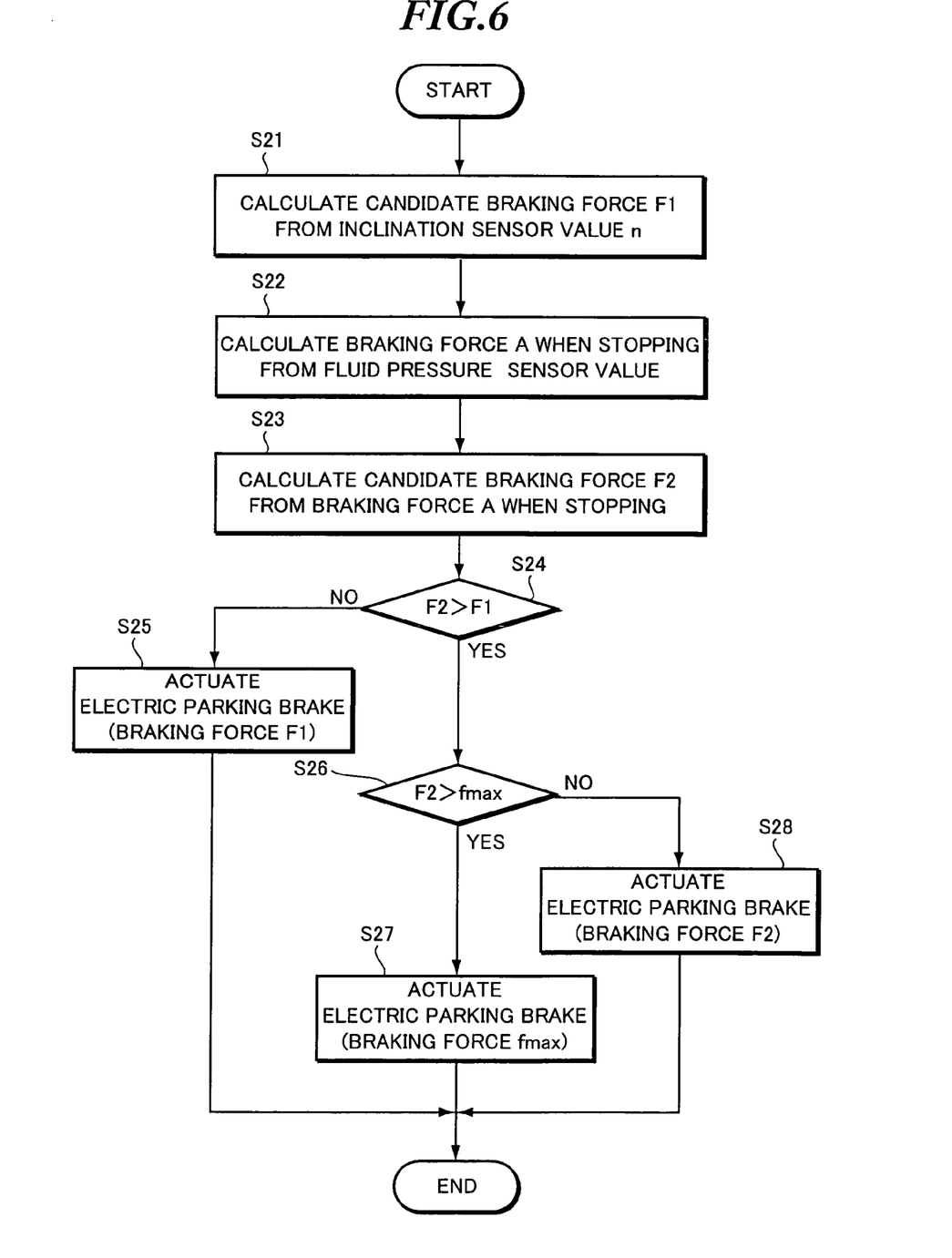
FIG. 6 is a flowchart illustrating a control of the electric parking brake system, as shown in FIG. 4, for setting a braking force thereof.

FIG. 6 is a flowchart for explaining the operation performed when setting the target braking force of the electric parking brake system as the second embodiment. The process will be explained by following steps one by one. Moreover, the process explained by the following description follows process corresponding to the STEPS S01 and S02 explained in the first embodiment.

At STEP S21, the ECU 41 calculates a candidate braking force F1 on the basis of the output value from the inclination sensor 44. For example, the candidate braking force F1 is calculated by multiplying a predetermined safety ratio by the braking force required for stopping the vehicle on the inclined road with inclination detected by the inclination sensor 44.

At STEP S22, the ECU 41 calculates a braking force A generated by the main brake while the vehicle is stopping on the basis of the output value from the fluid pressure sensor 51. For example, the braking force A is calculated on the basis of: the brake fluid pressure obtained from the fluid pressure sensor 51; a piston diameter and a number of a brake caliper in each wheel; and an area, a friction coefficient etc. of contacting surfaces between a brake pad and a brake rotor.

At STEP S23, the ECU 41 calculates a candidate braking force F2 by multiplying the predetermined coefficient by the braking force A calculated at the step S22.

At STEP S24, the ECU 41 compares the candidate braking forces F1 and F2, and the process proceeds to the STEP S25 in the case of F2≦F1, or alternatively proceeds to the STEP S26 in the case of F2>F1.

At STEP S25, the ECU 41 actuates the actuator unit 20 by controlling the relay 42 after deciding the candidate braking force F1 as the target braking force, and then, the process terminates after changing over the parking brake condition from the released condition to the braking condition.

At STEP S26, the ECU 41 compares the respective values of the candidate braking forces F2 and a predetermined maximum braking force fmax as preset in consideration of the mechanical strength of the electric parking brake system in magnitude, and the process proceeds to the STEP S27 in the case of "candidate braking force F2>maximum braking force fmax", or alternatively proceeds to the STEP S28 in the case of "candidate braking force F2≦maximum braking force fmax".

At STEP S27, the ECU 41 actuates the actuator unit 20 by controlling the relay 42 after deciding the maximum braking force fmax as the target braking force, and then, the process terminates after changing over the condition of the parking brake 10 from the released condition to the braking condition.

At STEP S28, the ECU 41 drives the actuator unit 20 by controlling the relay 42 at the candidate braking force F2 as the target braking force, and changes over the parking brake 10 from the released condition to the braking condition. And then, it proceeds to end the process.

As explained above, according to the second embodiment of the present invention, even when the vehicle is stopped in the condition where the braking force of the main brake is small, for example, the AT creep force is compensated with a gravity force while the vehicle is stopped on a up-hill road, there is no occurrence of a shortage of the braking force, differently from the case, for example, where the target braking force is generated on the basis of only the output of the liquid pressure sensor since the target braking force is set based on both the outputs of liquid pressure sensor and the inclination sensor in the ECU 41 of the second embodiment. Therefore, the reliability of the electric parking brake system can be improved.

The present invention is not limited within the embodiments disclosed in the above explanation, but can be modified as follows.

(1) The aforementioned embodiment 1 uses the two sensing inclination sensors, and the embodiment 2 does the inclination sensor and the liquid pressure sensor of the main brake. However, the present invention is not limited within such embodiments, but the present invention can use sensing means other than these kinds of the sensors as the vehicle condition detecting means. In addition, the combination of more than two sensing lines of the inclination and the liquid sensors for the main braking force sensors can be applicable.

(2) The aforementioned embodiment 2 detects the brake fluid pressure, but the stepping pressure on the brake pedal by the foot or an operational stroke of the brake pedal may be detected as a parameter in relation with the braking force of the main brake.

(3) The aforementioned embodiments 1 and 2 set the target braking force in accordance with only the output which has the tendency to make the target braking force large (the other "weights" than this is set as "0" in this case). However, the output value from the other vehicle condition detecting sections may be used for setting the target braking force after setting a relatively lighter weighting for the other output values from the other vehicle condition detecting sections without limiting this embodiment.

(4) In the case of providing the plurality of the inclination sensors, if the output value of one inclination sensor is frequently lower than those of the others, a self-diagnosis function of judging that the malfunction occurs in this inclination sensor may be provided. And, in the case that such a phenomenon is caused from a defect of the gain setting, the output gain value of the inclination sensor maybe automatically adjusted, so that failsafe characteristics can be also improved.

(5) Although the parking brake of each embodiment uses the drum provided on the inner diameter side of the brake disk for a foot brake, the other types of the parking brake can be used for the present invention. For example, friction materials for the disc brake and the drum brake of the foot brake can be collaterally used and integrally formed with the parking brake itself.

(6) According to the parking brake of each embodiment of the present invention, the parking brake is driven through using the electric actuator fixed on the vehicle body via the parking brake cable. However, the present invention is not limited to examples within these embodiments, that is, the present invention can be also applicable for a built-in type of electric parking brake system, in which the electric actuator is provided at a side of the wheel hub and is formed integrally with the parking brake.

Third Embodiment

Next, a third embodiment of the present invention will be explained with reference to FIGS. 7-9. The explanation about the same parts as those of the first embodiment is omitted, and the explanation about different points therefrom is mainly given.

Figure 7:
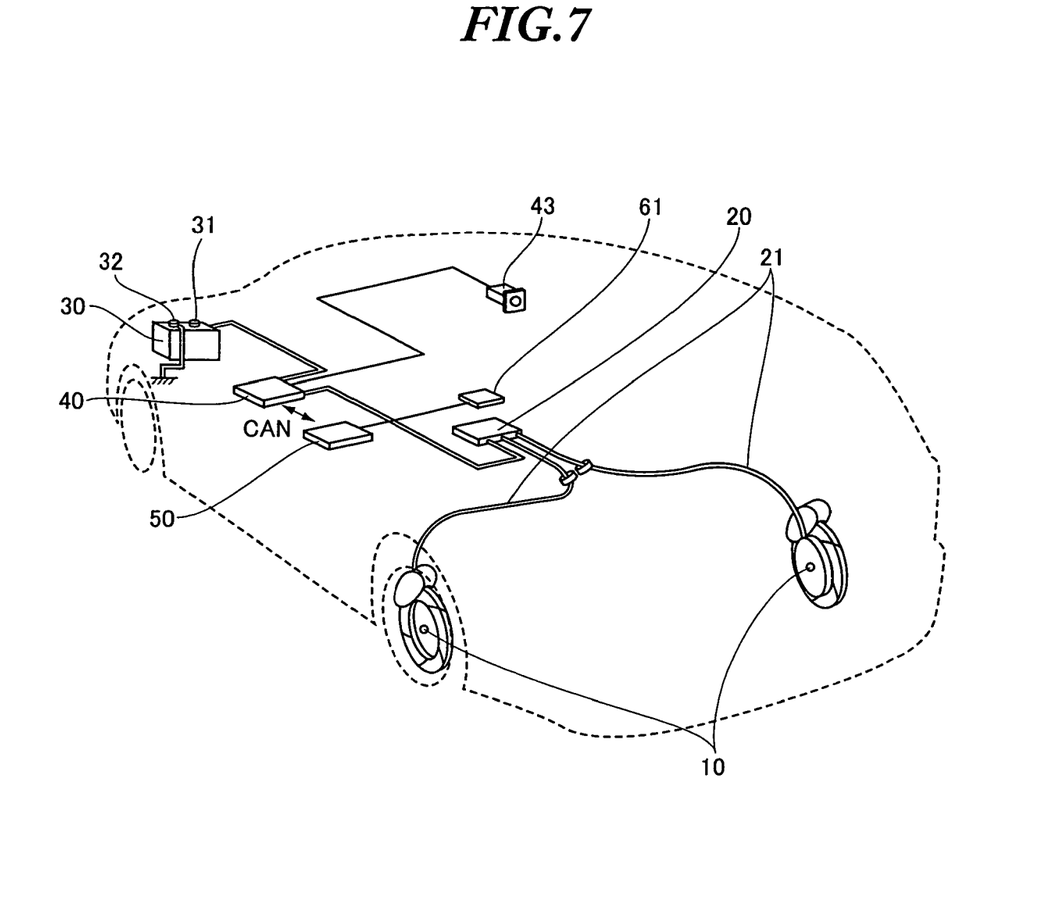
FIG. 7 is a schematic view showing a structure of an electric parking brake system as a third embodiment of the present invention.
Figure 8:
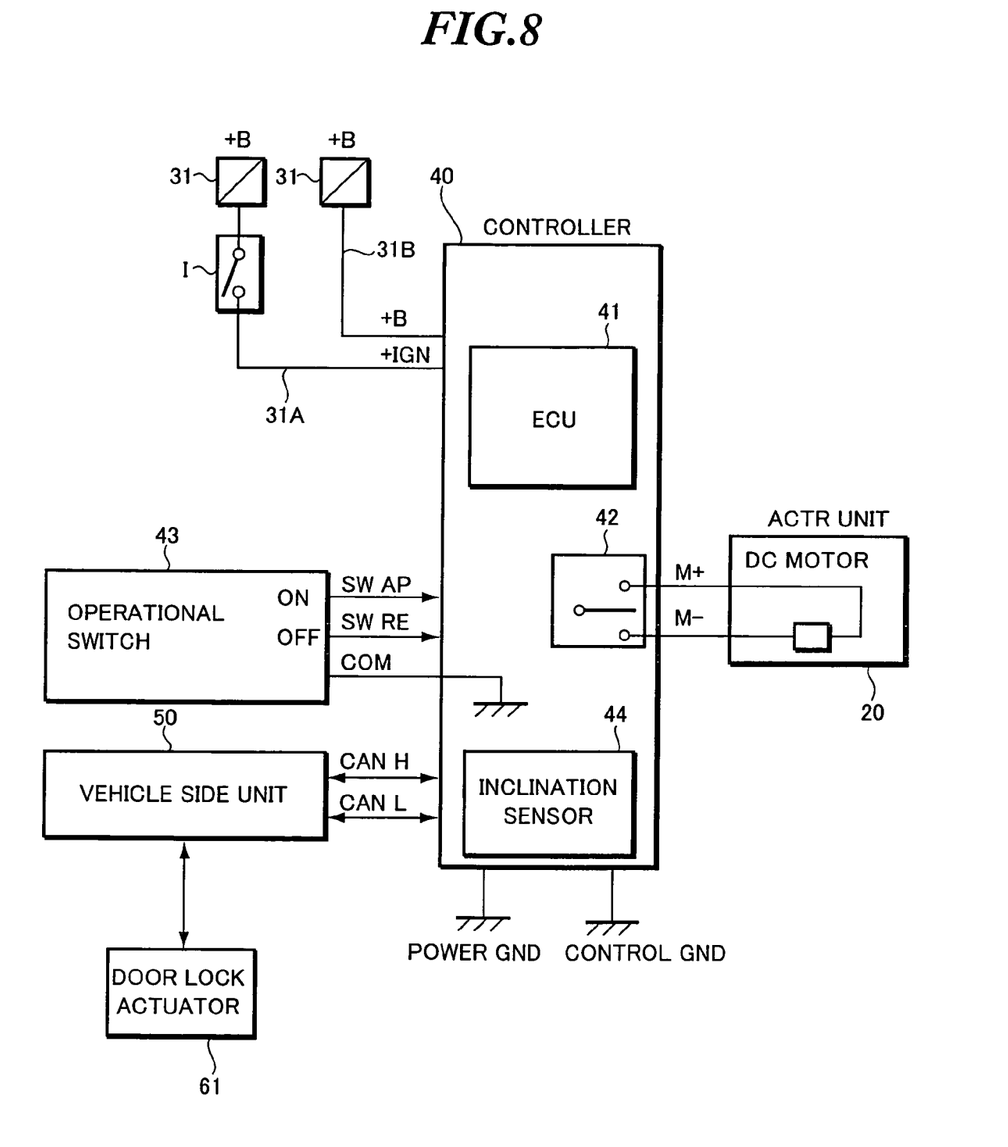
FIG. 8 is a block diagram for showing a circuit structure of the electric parking brake system of FIG. 7.
Figure 9:
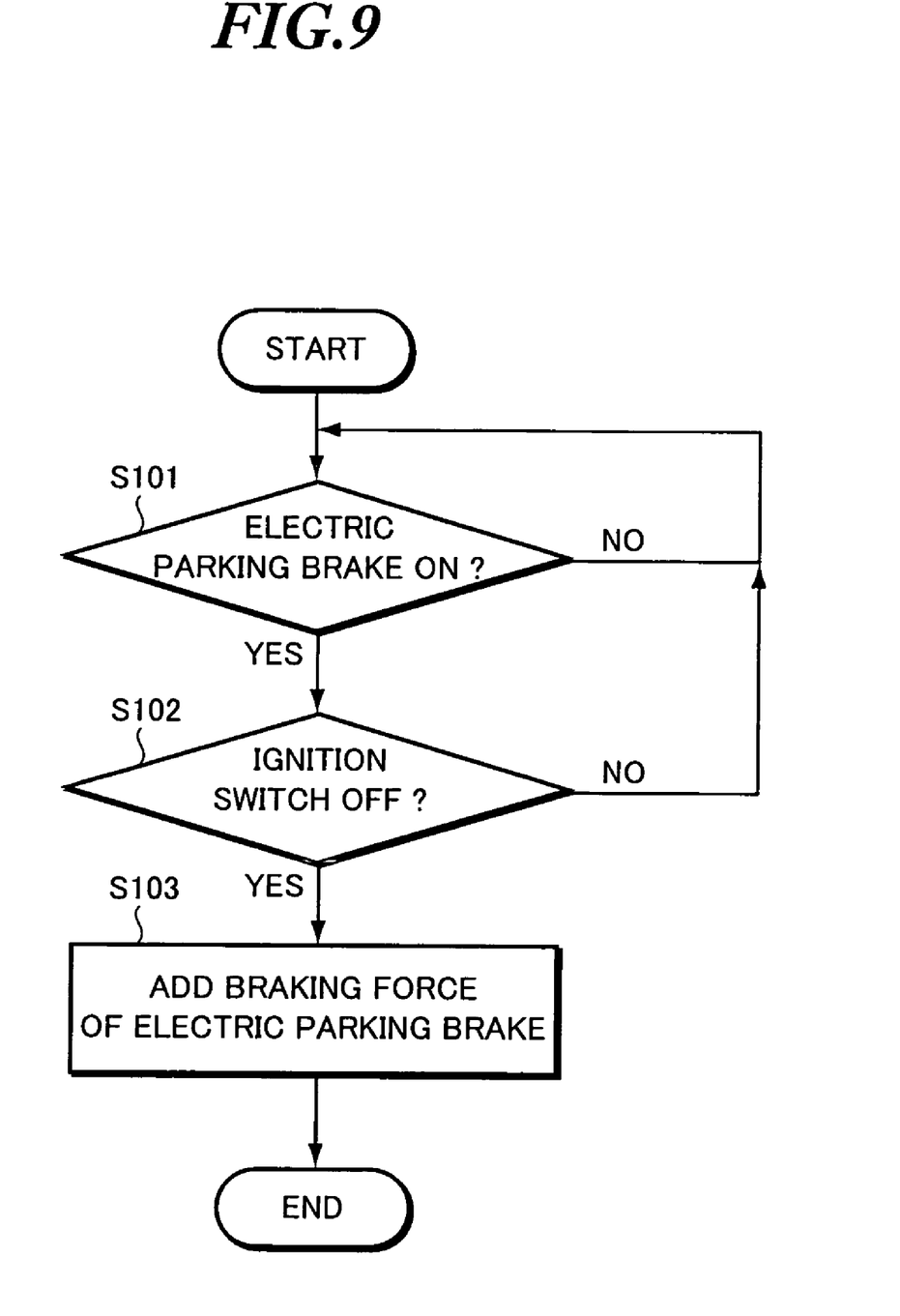
FIG. 9 is a flowchart illustrating an adding pull control of the electric parking brake system as shown in FIG. 7.

FIG. 7 is a schematic view illustrating a structure of an electric parking brake system as the third embodiment of the present invention, and FIG. 8 is a block diagram illustrating a circuit of the electric parking brake system as shown in FIG. 7.

As shown in FIG. 7, the electric parking brake system is provided with the parking brake 10, the actuator unit 20, the battery 30, the controller 40, the operational switch 43 and the vehicle side unit 50, which are identical with components of the first embodiment, and a door lock actuator 61 which is not included in the first embodiment.

As shown in FIG. 8, the plus terminal 31 of the battery 30 is connected to the controller 40 via a harness. The harness for providing the electric power from the plus terminal 31 to the controller 40 is provided with an ignition harness 31A and an always connecting harness 31B. An ignition relay I is inserted at an intermediate position of the ignition harness 31A, which switches over a connection or a disconnection between the battery 30 and the controller 40 under the situation linked with an ON-OFF function of an ignition switch. More specifically, the ignition relay I is connected when the engine as power source for vehicle running is operating. Moreover, the always connecting harness 31B is constantly connected to the power source without any relation with the operation of the ignition switch at any time.

On the other hand, the minus terminal 32 is grounded to a vehicle body in the same way as that of the first embodiment.

The controller 40 is a control unit provided with the ECU 41, the relay 42, and the inclination sensor 44.

The ECU 41 is provided with the CPU for judging whether or not the electrical parking brake 10 should be operated, and for controlling a pulling force to the parking brake cable 21, as described later, in response to the input signals from the operational switch 43 and the vehicle side unit 50.

The inclination sensor 44 is used for detecting a road inclination mainly caused by a running road condition and for deciding the braking force while stopping the vehicle.

The controller 40 has a function as a detecting section of a vehicle stopping operation for detecting an OFF operation of the ignition switch, which is a stopping operation of the running power source of the vehicle, namely a vehicle parking condition detecting function, on the basis of an electric current existence or nonexistence in the ignition harness 31A.

In the same fashion as the first embodiment, the vehicle side unit 50 is provided with, for example, the engine control unit for controlling the engine of the vehicle, the transmission control unit for controlling the transmission of vehicle, the VDC control unit for performing the VDC control including the ABS control unit and the integrated vehicle control unit for integrally controlling the other electrical equipments of the vehicle. All of the above mentioned control units are communicated with the controller 40 via the CAN communication system which is one kind of LAN systems mounted on the vehicle.

The vehicle side unit 50 supplies the information about, for example, an engine r. p. m., an opening degree of an accelerator pedal, a shift position of the transmission, an operational condition of the foot brake pedal and a rotational speed of a wheel etc., to the controller 40 one by one. The controller 40 provides the driving electric power to the actuator unit 20 after controlling the relay 42 through judging that the parking brake is required to be actuated in case of that the vehicle condition is changed from the running condition to the parking condition on the basis of these input signals. On the other hand, the controller 40 changes the parking brake 10 from the braking condition to the released condition in the case of that the vehicle condition is changed from the stopping condition to the running condition.

In this case, a braking force Fs generated from the parking brake 10 is set to prevent the creep movement of the vehicle in consideration of an AT creep force, the inclination degree of the road etc., at that time. And then, the actuator unit 20 pulls the parking brake cable 21 by a predetermined stroke amount Ss as preset in consideration of the braking force Fs and a friction coefficient which occurs between the brake drum and the brake shoe while driving the vehicle.

In the present embodiment, the vehicle side unit 50 is connected with a door lock actuator 61. The door lock actuator 61 is used to lock or unlock a door lock apparatus of a door for passengers. The door lock actuator 61 is controlled, for example, by a remote control switch of a remote control unit held by the user and also by a known keyless entry apparatus having a transmitter for confirming an ID code after communicating with a communication unit provided on the vehicle on the basis of the user's instruction. Moreover, the integrated vehicle control unit provided in the vehicle side unit 50 detects a door lock signal outputted from the door lock actuator 61 and transmits it to the controller 40, that is, works as a door locking actuation detector.

Next, explained will be the control for the addition of the pulling force to the parking brake cable 21 (hereinafter referred to as "additional pulling control") as performed when parking, which is concerned with the third embodiment of the electric parking brake system of the present invention. Moreover, in the present specification, the term, "parking" represents the situation that a stopping condition of the vehicle continues for a long time and that the driver and the other passengers are leaving far from the vehicle. FIG. 9 is a flowchart showing the additional pulling control. The following is the explanation of a process thereof step by step.

At STEP S101, the controller 40 detects whether or not the electric parking brake 10 is in the braking condition, in other words, the electric parking brake is ON, and then it goes to the STEP S102 after judging that the vehicle is in the stopping condition. If the parking brake 10 is released, in other words, the electric parking brake is OFF, it repeats the STEP S101 since it is judged that the vehicle is in the running condition.

At STEP S102, the controller 40 detects whether or not the ignition switch is cut off. This detection is performed by detecting a cutoff operation of an electric power supply after monitoring the ignition harness 31A.

In the case of that the ignition switch is cut off, it goes to the STEP S103 through judging that the vehicle condition is changed from the stopping condition to the parking condition. In the case of that the ignition switch is not cut off, it returns to the STEP S101 through judging that the vehicle condition is still in the stopping condition, not parking condition, and repeats the processes following the STEP S101.

At STEP S103, the controller 40 further provides the driving electric power to the actuator unit 20 via the relay 42. More specifically, the controller 40 adds a further pulling force with a larger stroke Sp than that of the former stroke Ss to the parking brake cable 21, and then finishes the additional pulling control process by setting a larger braking force Fp than the former braking force Fs of the parking brake 10.

Moreover, the braking force Fp is preset under the consideration that the creep movement caused by the AT creep can be prevented in the situation where the idling r. p. m. of the engine increases after a restarting operation thereof when the vehicle is in the parking condition by stopping the engine. And further, assuming that the friction coefficient of the brake drum and the brake shoe of the parking brake 10 may become smaller by cooling down thereof, the braking force Fp is preset a little more largely than usual so that the above mentioned creep movement of the vehicle can be prevented. This braking force Fp is preset by, for example, multiplying a predetermined increasing rate by the braking force Fs or by adding the additional braking force.

As explained above, the following effects can be attained according to the third embodiment of the present invention.

(1) Since the braking force of the parking brake 10 is preset at a larger value by performing the additional pulling thereof in the case where the electric parking brake is being operated and that the ignition switch is cut off, the braking force can be sufficiently secured even in the decrement of the friction coefficient due to cooling of the brake drum and the brake shoe while parking. And further, the creep movement of the vehicle caused by the road inclination while parking also can be prevented by the braking force preset at the larger value. And furthermore, since the braking force is preset at the larger value in advance while parking, the creep movement of the vehicle can be prevented even when the AT creep force becomes large through the idle up operation performed at the time of the engine restarting.

(2) Being detected on the basis of the existence or nonexistence of an electric current to the ignition harness 31A, the OFF operation of the ignition switch can be detected by a simple structure.

(3) Since the above mentioned adding pull control is performed when parking, the braking force Fs as frequently used, for example, in a short time parking can be set at a small value on the basis of the vehicle information such as the current engine speed and the current road inclination. Therefore, it is very advantageous for maintaining a durability of the system.

(4) Being automatically performed without giving a burden to the driver, the above mentioned adding pull control is very useful.

Fourth Embodiment

Figure 10:
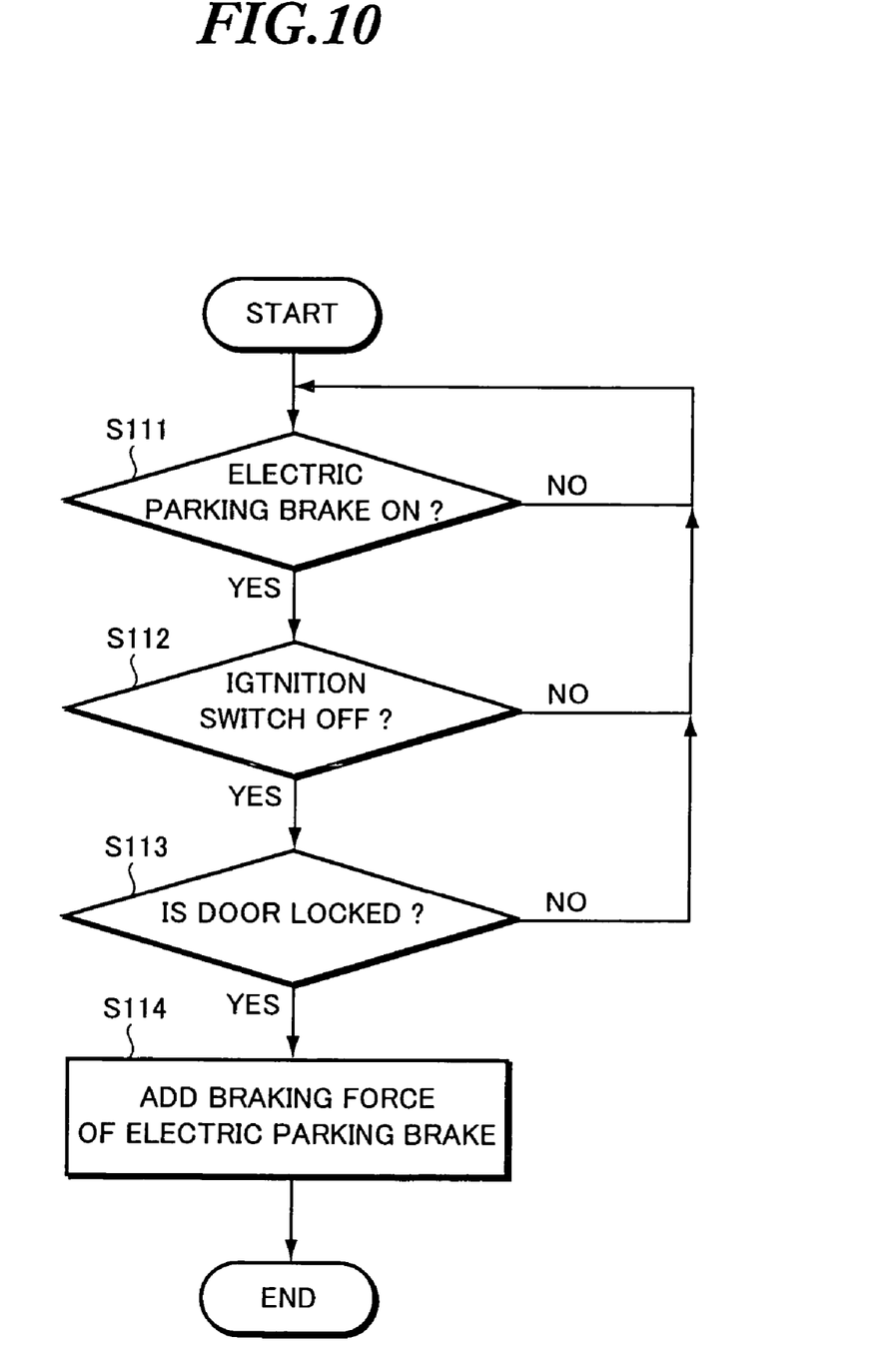
FIG. 10 is another flowchart illustrating an adding pull control of an electric parking brake system as a fourth embodiment of the present invention.

In addition, a fourth embodiment of the present invention will be explained with reference to FIG. 10, which is the flowchart for explaining the adding pull control in the electric parking brake system of the fourth embodiment.

First, at STEP S111, the controller 40 detects whether or not the parking brake 10 is in the braking condition, and then it goes to the STEP S112 if it is judged that the vehicle is in the braking condition. If the parking brake 10 is judged to be released, it repeats the STEP S111.

At STEP S112, the controller 40 detects whether or not the ignition switch is cut off, and then it goes to the STEP S113 if it is judged that the ignition switch is off. If the ignition switch is not at an OFF position, it returns to the STEP S111 to repeat the following flow.

At STEP S113, the controller 40 detects whether or not the door lock is actuated on the basis of an actuating condition of the door lock actuator 61 transmitted from the vehicle side unit 50. The program proceeds to the STEP S114 in the case where the door is locked, or it returns to the STEP S111 and repeats the following processes in the case where the door is not locked.

At STEP S114, the same process of the additional pulling operation as explained in the STEP S103 of the third embodiment is performed, and then the program terminates.

As explained above, according to the fourth embodiment of the present invention, the change to the parking condition of vehicle is detected based on the off condition of the ignition switch and the lock condition of the door lock actuator 61. Thereby, an unnecessary additional pulling operation can be avoided when there occurs the engine stop for fueling or for the idle stop condition, that is, when only the ignition switch is just in off operation. As a result, a mechanical burden to the electric parking brake can be effectively reduced by lowering the frequency in repeating the additional pulling operations.

The present invention is not limited within the embodiments disclosed in the above explanation, but can be modified as follows.

(1) Any change from the stopping condition to the parking condition of the vehicle or vice verse may be detected on the basis of components other than the OFF operation of the ignition switch and the locking condition of the door lock apparatus. For example, the change to the parking condition may be detected on the basis of whether or not there is existence of communication with a transmitter for a keyless entry apparatus, of a seat occupation or an operation of a steering wheel for holding the steering wheel in an upright state, if available.

(2) The running power source may be, for example, an electric motor driven by a secondary battery or a fuel battery, or a hybrid system combined with the engine and the electric motor other than the engine. And also, the input section for stopping the operation may be, for example, a main switch thereof, not the ignition switch.

(3) Although the parking brake of each embodiment has the drum disposed at an inner diameter side of the brake disc for the foot brake, the other types of the parking brake may be applicable. For example, the parking brake may be integrally formed with friction materials of the disc brake or the drum brake for the foot brake. Since the friction materials of such a parking brake have a very high temperature while running, a change of friction coefficient would become large, so that the effect of the present invention becomes very remarkable.

(4) Although the embodiment of the present invention detects the locking state of the door lock apparatus on the basis of the signal outputted from the door lock actuator controlled by the keyless entry, the other type of method may used for detecting the locking state thereof. For example, the locking state may be detected on the basis of a rotational operation of a key in the key cylinder, the key of which is inserted by the user.

While there has been described what are at present considered to be preferred embodiments of the present invention, it will be understood that various modifications may be made thereto, and it is intended that appended claims cover all such modifications as fall within the true spirit and scope of the present invention.

What is claimed is:

1. An electric parking brake system, comprising:
   a parking brake for changing a braking force of a vehicle;
   an actuator in driving communication with said parking brake;
   a relay device in communication with said actuator for having the actuator set the parking brake in one of a first mode, second mode or third mode, with the first, second and third modes being respectively represented by a parking brake release mode, a parking brake in a first brake force level mode, and a parking brake in a second brake force level mode which is at a higher brake force level than said first brake force level mode;
   a controller;
   a manual operation switch which comprises respective on and off switch setting positions, said manual operation switch being in communication with said controller such that said actuator is driven to cause said parking brake to assume a braking state upon the manual operation switch being manually set to on by an operator and to release the parking brake from the braking state upon the manual setting of the manual operation switch to an off state;
   a vehicle side unit that is in communication with said controller and monitors one or more vehicle running conditions and conveys to said controller information as to enable the controller to determine when a vehicle is in a running condition and when a vehicle is in a stopping condition;
   a parking condition detecting section that detects when a vehicle has changed from the stopping condition to a parking condition, said parking condition detecting section also being in communication with said controller to convey to said controller when the vehicle has adjusted from said stopping condition to a parking condition; and
   said controller having a control unit that is configured, when said vehicle side unit inputs information to the controller indicating that the vehicle has gone from said running condition to said stopping condition, to instruct said relay device to direct said actuator to go from said first mode to said second mode, and said control unit being further configured as to instruct said relay device to adjust from said second mode to said third mode upon an input from said parking condition detecting section that the vehicle has gone from said stopping condition to said parking condition and under a condition that said manual operation switch is set to off.

2. The electric parking brake system of claim 1 wherein detecting whether there has been a change in condition of the vehicle from the stopping condition to a parking condition includes a check as to whether the vehicle is currently in a stopping condition and also a check as to whether the vehicle is considered to be in a state where the vehicle will be stopped for a period longer than a period that would satisfy criteria for meeting the stopping condition, and wherein the controller is configured such that the manual operation switch is in the off switch setting upon completion of the change in condition of the vehicle from the running condition to the stopping condition.

3. The electric parking brake system according to claim 1, wherein the parking condition detecting section includes a stopping operation detecting section for detecting a stopping operation of a driving power source of the vehicle, and the controller sets the braking force of the parking brake to the second brake force level mode when the parking brake is deemed in a braking state under the stopping condition and the stopping operation is being detected.

4. The electric parking brake system according to claim 1, wherein the parking condition detecting section includes a locking sensor for detecting a locking state of a door lock apparatus of the vehicle, and the controller sets the braking force of the parking brake to the second brake force level mode with input received as to the parking brake in a braking state under the stopping condition and the locking state of the door lock apparatus of the vehicle.

5. The electric parking brake system of claim 1 wherein said parking condition detection section detects whether there has been a change in condition of the vehicle from the stopping condition to a parking condition by checking whether the parking brake is currently on based on stopping condition detection as well as a sensed additional parameter as to a state of the vehicle that is indicative that the vehicle will be in a state where it will be stopped for a period longer than a period that would satisfy criteria for meeting the stopping condition, and a determination as to whether the sensed additional parameter is met is not carried out when the parking brake is detected as not being currently on.

6. The electric parking brake system of claim 5 wherein the sensed additional parameter that is indicative that the vehicle will be in a state where it will be stopped for a period longer than a period that would satisfy criteria for meeting said stopping condition, is whether the vehicle ignition switch is off.

7. The electric parking brake system of claim 1 wherein a change form the stopping condition to the parking condition is achieved free of operator input relative to said electric parking brake system.

8. The electric parking brake system of claim 1 wherein said parking condition detection section detects whether there has been a change in condition of the vehicle from the stopping condition to a parking condition by determining that there exists an indication that a driver of the vehicle is intent on leaving the vehicle.

9. The electric parking brake system according to claim 8, wherein the parking condition detecting section detects the state where there exists an indication that a driver of the vehicle is intent on leaving the vehicle on the basis of at least one of an ignition switch shut off, a combination ignition switch shutoff and door look activation, a transmitter state with a keyless entry apparatus, a seat occupation detection state, and a steering wheel holder adjustment detection state.

10. The electric parking brake system according to claim 1, wherein the parking condition detecting section includes a stopping operation detecting section for detecting a stopping operation of a driving power source of the vehicle and a locking sensor for detecting a locking state of a door lock apparatus of the vehicle, and the controller sets the braking force of the parking brake to the second brake force level mode when the parking brake is deemed in a braking state under the stopping condition, and also the stopping operation and the locking state of the door lock apparatus of the vehicle are being detected.

11. The electric parking brake system according to claim 1, wherein the stopping condition detecting section detects the vehicle in the stopping condition on the basis of at least one of an engine rotational speed, an opening degree of an accelerator pedal, a shift position of a transmission, an operational condition of a brake pedal and a rotational speed of a wheel.

12. The electric parking brake system of claim 1 wherein a change form the stopping condition to the parking condition is achieved free of operator input relative to said electric parking brake system.

13. The electric parking brake system of claim 1 further comprising a vehicle ignition switch in communication with said controller and wherein said control unit directs said relay device to adjust from said second mode to said third mode upon a detection of a shut off of said ignition switch.

14. The electric parking brake system of claim 13, wherein said vehicle side unit conveys to said controller a change from a running condition to a stopping condition when the vehicle side unit outputs information establishing a prerequisite vehicle stopping state relative to at least one of vehicle wheel speed, engine rpm, a shift position of a vehicle transmission, and an operational condition of a vehicle foot brake.

15. The electric parking brake system of claim 1 further comprising a vehicle ignition switch in communication with said controller and a door lock actuator monitoring device in communication with said controller, and wherein said control unit directs said relay device to adjust from said second mode to said third mode upon a detection of each of a shut off of said ignition switch and an actuation of a vehicle door lock by said door lock actuator.

16. An electric parking brake system, comprising:
a parking brake for changing a braking force of a vehicle;
an actuator in driving communication with said parking brake;
a controller;
a manual operation switch which comprises respective on and off switch setting positions, said manual operation switch being in communication with said controller such that said actuator is driven to cause said parking brake to assume a braking state upon the manual operation switch being manually set to on by an operator and to release the parking brake from the braking state upon the manual setting of the manual operation switch to an off state;
a vehicle side unit that is in communication with said controller and monitors one or more vehicle running conditions and conveys to said controller information as to enable the controller to determine when a vehicle is in a running condition and when a vehicle is in a stopping condition;
a parking condition detecting section that detects when a vehicle has changed from the stopping condition to a parking condition, said parking condition detecting section also being in communication with said controller to convey to said controller when the vehicle has adjusted from said stopping condition to said parking condition; and
said controller being configured such that, when said vehicle side unit inputs information to the controller indicating that the vehicle has gone from said running condition to said stopping condition, said controller causes said actuator to go from a brake release mode to a first brake level braking mode, and said controller being further configured as to cause said actuator to adjust from said first brake level braking mode to a second brake level braking mode which is higher than said first brake level braking mode upon an input from said parking condition detecting section that the vehicle has gone from said stopping condition to said parking condition and under an additional condition that said manual operation switch is set to off.

17. The electric parking brake system of claim 16, wherein said manual operated switch is configured for hand manipulation by an operator.

18. The electric parking brake system of claim 16, wherein said manual operated switch is limited to just the on and off settings.

19. The electric parking brake system according to claim 16, wherein the parking condition detecting section includes a stopping operation detecting section for detecting a stopping operation of a driving power source of the vehicle and a locking sensor for detecting a locking state of a door lock apparatus of the vehicle, and the controller sets the braking force of the parking brake to the second brake force level mode when the parking brake is deemed in a braking state under the stopping condition, and also the stopping operation and the locking state of the door lock apparatus of the vehicle are being detected.

20. The electric parking brake system according to claim 16, further comprising: a plurality of vehicle condition detecting sections for detecting conditions of the vehicle and for outputting respective output values of the detected vehicle conditions, the output values being used for setting a target braking force; and a target braking force setting section for applying a larger weighting to one output value which makes the target braking force larger than other output values after comparing the output values from the vehicle condition detecting sections, and for setting the target braking force based on the weighted output value.

21. The electric parking brake system according to claim 20, wherein the vehicle condition detecting sections include a plurality of inclination sensors for detecting an inclination of the vehicle, and the target braking force setting section sets the target braking force on the basis of a larger output value of one inclination sensor than the output values of the other inclination sensors.

22. The electric parking brake system of claim 16 wherein said parking condition detection section detects whether there has been a change in condition of the vehicle from the stopping condition to a parking condition by checking whether the parking brake is currently on based on stopping condition detection as well as a sensed additional parameter as to a state of the vehicle that is indicative that the vehicle will be in a state where it will be stopped for a period longer than a period that would satisfy criteria for meeting the stopping condition, and a determination as to whether the sensed additional parameter is met is not carried out when the parking brake is detected as not being currently on and wherein the sensed additional parameter is whether the vehicle ignition switch is off.

* * * * *